US012714629B1

(12) United States Patent
Wallace

(10) Patent No.: US 12,714,629 B1
(45) Date of Patent: Aug. 25, 2026

(54) SOFT TISSUE MOBILIZATION DEVICE WITH SELECTIVE ROTATIONAL AND AXIAL LOCKING MECHANISM

(71) Applicant: Jesse Wallace, San Antonio, TX (US)

(72) Inventor: Jesse Wallace, San Antonio, TX (US)

( * ) Notice: Subject to any disclaimer, the term of this patent is extended or adjusted under 35 U.S.C. 154(b) by 0 days.

(21) Appl. No.: 19/392,984

(22) Filed: Nov. 18, 2025

(51) Int. Cl.
*A61H 7/00* (2006.01)

(52) U.S. Cl.
CPC ..... *A61H 7/001* (2013.01); *A61H 2201/0107* (2013.01); *A61H 2201/0119* (2013.01); *A61H 2201/0153* (2013.01); *A61H 2201/1253* (2013.01); *A61H 2201/1664* (2013.01); *A61H 2201/5025* (2013.01)

(58) Field of Classification Search
CPC .................... A61H 7/003; A61H 7/001; A61H 2201/1253; A61H 2201/1654; A61H 2201/1664; A61H 2201/1671; A61H 2201/1685; A61H 2201/1695; A61H 39/04; B25B 5/067; B25B 5/163; B25B 5/068
See application file for complete search history.

(56) References Cited

U.S. PATENT DOCUMENTS 9,289,884 B2 3/2016 Patel et al.
9,522,456 B2 12/2016 Cicenas et al.
11,065,173 B1 7/2021 Thorn
2003/0009116 A1* 1/2003 Luettgen ................ A61H 19/34 601/72
2004/0140602 A1 7/2004 Gerritsen et al.
2004/0195746 A1 10/2004 Marks
2004/0245692 A1 12/2004 Brass et al.
2012/0193853 A1 8/2012 Patel et al.
2014/0265085 A1 9/2014 Albin
2016/0296415 A1 10/2016 Cross
2019/0142685 A1 5/2019 Heller
2023/0190569 A1* 6/2023 Wallace ................. A61H 7/003 601/133

FOREIGN PATENT DOCUMENTS

DE 202019106381 U1 2/2021

OTHER PUBLICATIONS

TheraBody Technologies, "ProSqueeze: The World's Best Self-Massager", Jul. 20, 2018, Kickstarter, All Pages, provided by WayBack Machine (Year: 2018).

* cited by examiner

*Primary Examiner* — Joseph D. Boecker
*Assistant Examiner* — Brian T Khong
(74) *Attorney, Agent, or Firm* — Outlier Patent Attorneys, PLLC

(57) ABSTRACT

A soft tissue mobilization device includes a shaft, a treatment member fixedly coupled to the distal end of the shaft, and a support member configured to translate axially and rotate relative to the shaft. A pressure applicator on the treatment member is configured for being in direct contact with a desired treatment area of a patient's body. A support pad on the support member is configured for being in direct contact with a second area of the patient's body. The support member translates along the shaft towards the treatment member in order to increase pressure applied by the pressure applicator. The support member includes two actuators—a handle and a trigger. Squeezing the handle causes incremental axial translation of the support member along the shaft. Squeezing the trigger allows rotational positioning and axial translation of the support member relative to the shaft.

13 Claims, 13 Drawing Sheets

SOFT TISSUE MOBILIZATION DEVICE WITH SELECTIVE ROTATIONAL AND AXIAL LOCKING MECHANISM

BACKGROUND

Field of the Art

The present disclosure is related to the field of therapeutic massage devices, and more particularly to self-administered soft tissue mobilization devices.

Discussion of the State of the Art

Soft tissue mobilization and myofascial release techniques are widely recognized as essential therapeutic approaches for treating muscle tension, adhesions, and scar tissue. These manual therapy techniques, based on principles of cross-friction massage, are commonly employed to address dysfunctions in ligaments and other musculoskeletal tissues by breaking down fascial restrictions that may cause pressure or limitations within the musculature. However, the practical application of these therapeutic techniques presents significant challenges, particularly when individuals attempt self-treatment without professional assistance.

The human body's complex anatomical structure creates inherent difficulties in accessing all areas requiring treatment. Many regions, particularly the back, shoulders, and other hard-to-reach areas, remain effectively inaccessible to individuals attempting self-treatment. This limitation forces people to rely on professional services from physical therapists, massage therapists, or chiropractors, which are often costly and not always readily available when needed. Even when professional treatment is available, practitioners face their own challenges, as they must work without the benefit of self-sensory feedback, making it difficult to determine optimal pressure levels. Professional practitioners may apply insufficient pressure to effect meaningful change, or conversely, excessive pressure that causes the tissue to tense defensively, preventing the relaxation necessary for effective treatment.

Existing self-treatment tools present multiple operational drawbacks that limit their effectiveness. Foam rollers, plastic rollers, balls, and massage sticks require users to maintain awkward, often unsustainable positions while relying on gravity or muscle exertion to generate treatment pressure. The use of muscle exertion is particularly problematic as it directly contradicts the relaxation required for optimal therapeutic results. These tools frequently fail to reach targeted areas effectively due to their size and shape limitations, and they often cannot adequately pin down soft tissue, which tends to shift away from the tool during use. The non-adjustable nature of gravity-based pressure and the difficulty in maintaining consistent muscle exertion further compromise treatment effectiveness.

The anatomical complexity of the human body compounds these challenges. The body's curved surfaces and non-parallel structures require treatment angles that vary significantly from one area to another. When attempting to treat areas such as the back, the support and compression points are rarely aligned in parallel planes, necessitating angular adjustments that rigid or non-adjustable tools cannot accommodate. This misalignment between tool geometry and body contours severely limits the areas that can be effectively treated and restricts the types of compression mechanisms that can be successfully employed.

Traditional instrument-assisted soft tissue mobilization devices, while effective when used by trained practitioners, share the fundamental limitation of reach. These devices can only access areas within the user's natural range of motion, requiring assistance from another person for treating inaccessible regions. This dependency on external assistance eliminates the possibility of true self-treatment for many areas of the body where therapeutic intervention is most needed.

Attempts to address these limitations through mechanical devices have encountered significant technical obstacles. Bar clamp mechanisms commonly used in woodworking applications provide incremental compression capabilities through trigger-actuated mechanisms, but these devices are specifically designed for flat, parallel surfaces. The rectangular or fixed-geometry slide bars used in such mechanisms prevent any rotational adjustment between compression components, making them unsuitable for the varied contours and non-parallel surfaces of the human body. The inability to accommodate rotational forces not only limits treatment applications but also creates structural vulnerabilities, as any twisting forces encountered during use could potentially damage the device mechanism.

The challenge of achieving optimal therapeutic pressure presents additional complications. Effective soft tissue mobilization requires carefully controlled, sustained pressure that can be incrementally increased as tissue relaxes. Too little pressure fails to effect meaningful change in the tissue, while excessive pressure causes defensive tensing that prevents therapeutic benefit. Existing tools and methods struggle to provide the precise pressure control necessary for optimal results, particularly when treating areas with varying tissue density and sensitivity. The step-wise increase in pressure required for deep tissue work demands a level of control and adjustability that current self-treatment options cannot adequately provide.

SUMMARY

The present invention is directed to a device for self-administered soft tissue mobilization therapy that offers users unprecedented control and effectiveness in treating their own muscles and soft tissues without professional assistance. The device includes a treatment member fixedly coupled to one end of an elongated shaft and a support member coupled to the shaft and configured to rotate and axially translate relative to the shaft. The ability to rotate the support member to any desired rotational position on the shaft fundamentally transforms how individuals can access therapeutic treatment for hard-to-reach areas while achieving results comparable to professional manual therapy.

The device in accordance with the present invention eliminates the primary limitation of existing self-treatment tools by enabling users to effectively reach and treat any area of their body, including traditionally inaccessible regions like the back, without requiring assistance from another person. This independence provides immediate relief when needed, eliminating dependency on scheduled appointments or the availability of healthcare professionals.

The device includes two actuators. One of the actuators is a trigger that locks and unlocks the rotational position and the axial position of the support member relative to the shaft. The second actuator is a handle that can be used to incrementally move the support member towards the treatment member, thereby increasing the pressure applied by the treatment member. The dual-control actuator system provides unmatched precision in both positioning and pressure application. Using the trigger, the support member can be rotated 360 degrees around the shaft so that the relative rotational position of the support member and the treatment member can match any body contour. The support member can then lock into a desired rotational position at precise 18-degree increments for reproducible treatment protocols. The separate handle then allows for controlled, incremental pressure increases without disturbing the optimal angle, enabling the gradual, step-wise pressure progression that therapeutic experts recommend for optimal results.

The lever-action compression handle generates substantial therapeutic pressure without exhausting muscle effort, allowing users to maintain treatment for extended periods without fatigue. This mechanical advantage is beneficial for achieving therapeutic effectiveness, as muscle tension from exertion is counterproductive to the relaxation required for successful soft tissue mobilization.

By delivering consistent, repeatable treatment quality comparable to professional manual therapy, the device provides significant cost savings over time. Users can perform daily treatments as needed without the recurring expense of professional services. The device pays for itself after just a few uses while providing unlimited access to therapeutic relief.

The incremental axial translation mechanism coupled to the handle and the rotational position locking mechanism coupled to the trigger are robust mechanisms that can withstand torsional forces that would damage or destroy conventional fixed-orientation devices. This durability ensures long-term reliability and protects the user's investment.

The device addresses multiple shortcomings of existing self-treatment tools. The dual-sided design effectively pins and stabilizes soft tissue, preventing the common problem of tissue displacement during treatment that renders many tools ineffective. Unlike gravity-dependent tools like foam rollers, users can precisely control and incrementally increase pressure to achieve optimal therapeutic results. The mechanical advantage eliminates the muscle fatigue that limits manual self-treatment, allowing users to maintain consistent pressure until the tissue fully relaxes. The 360-degree rotation capability ensures pressure can be applied at the most effective angle for any body region, unlike fixed tools that force suboptimal positioning The device accommodates various interchangeable pressure applicators and support pads, allowing customization for different tissue types, body regions, and treatment objectives. This adaptability makes it suitable for treating everything from large muscle groups to specific trigger points.

The precise rotational increments enable users to consistently return to effective treatment positions, facilitating systematic treatment approaches and allowing users to track progress over time. This repeatability is essential for developing effective self-care routines.

Unlike professional services that require scheduling and travel, the device provides on-demand relief whenever symptoms arise. This immediate accessibility is particularly valuable for managing chronic conditions or addressing acute pain that develops outside of business hours.

In one example, the invention is a soft tissue mobilization device that includes a shaft having a substantially circular cross-sectional shape, a proximal end, and a distal end. A treatment member is fixedly coupled to the distal end of the shaft and has a pressure applicator attached thereto. The pressure applicator is configured for being in direct contact with a desired treatment area of a patient's body. A support member is coupled to the shaft and configured to translate axially and rotate relative to the shaft. The support member has a support pad attached thereto, which is configured for being in direct contact with a second area of the patient's body. The support member translates along the shaft towards the treatment member in order to increase pressure applied by the pressure applicator. The soft tissue mobilization device may further include a grip member fixedly attached to the proximal end of the shaft.

The support member includes a handle configured to move between a compressed position and an extended position. An incremental axial translation mechanism is operably coupled to the handle and the shaft such that actuation of the handle between the extended position and the compressed position causes the support member to translate axially towards the distal end of the shaft by a predetermined incremental distance. The support member also includes a trigger configured to move between a squeezed position and a released position. A locking mechanism is operably coupled to the trigger and the shaft. The locking mechanism is configured to lock the support member in a rotational position on the shaft when the trigger is in the released position and is further configured to allow the support member to rotate and translate axially along to the shaft when the trigger is in the squeezed position. In one example, the locking mechanism may be configured to allow the support member to translate axially towards the proximal end of the shaft when the trigger is in the squeezed position. The incremental axial translation mechanism may include a friction plate that is tilted forward to prevent axial translation of the support member towards the distal end of the shaft when the handle is in the extended position and the trigger may include an internal portion that is tilted backward to prevent axial translation of the support member towards the proximal end of the shaft when the trigger is in the released position.

The support member may include a housing and the shaft may be disposed through a central portion of the housing. The handle and the trigger may be operably coupled to the housing and configured to actuate relative to the housing.

The incremental axial translation mechanism may include a compression spring surrounding the shaft and a friction plate having a central opening. The shaft may be disposed through the central opening. When the handle is in the extended position, the friction plate may be tilted at a first angle and may be in frictional engagement with the shaft such that axial translation of the support member towards the distal end of the shaft is prevented. Moving the handle from the extended position to the compressed position may cause the compression spring to compress and may cause the friction plate to move from the first angle to a second angle, thereby causing the support member to translate axially towards the distal end of the shaft by the predetermined incremental distance.

The trigger may include an external portion configured for actuation by a user, and an internal portion disposed inside the housing. The internal portion may include a through opening and a pair of arms that are situated on opposite sides of the shaft. The shaft may be positioned in the through opening and may be configured to rotate and translate axially relative to the trigger when the trigger is in the squeezed position.

The locking mechanism may include: a first compression spring positioned between the trigger and an inner surface of the housing and configured for biasing the trigger in the released position; a locking member having a gear locked position and a gear released position; a second compression spring positioned between the inner surface of the housing and the locking member and configured for biasing the locking member into the gear locked position; a fixed gear that is in a rotationally fixed position relative to the shaft and that is configured to translate axially relative to the shaft; a rotatable gear that is configured to move between a rotationally locked position in which the rotating gear is prevented from disengaging with the fixed gear, and a rotationally unlocked position in which the rotatable gear is allowed to disengage from, and rotate relative to, the fixed gear upon application of a sufficient amount of rotational force by a user; and a third compression spring positioned between the trigger and the rotatable gear and configured to bias the rotatable gear into engagement with the fixed gear. The fixed gear and the rotatable gear may have teeth on their respective contacting surfaces that are engaged together. The shaft may include longitudinal grooves and the fixed gear may include inwardly protruding teeth that may be positioned in the longitudinal grooves such that the fixed gear may be configured to translate axially relative to the shaft and may be prevented from rotating relative to the shaft. The fixed gear may include an outer groove around an outer peripheral surface thereof, and the support member housing may include a protruding element that protrudes into the outer groove such that the housing and the fixed gear have axial positions that may be fixed relative to each other and the housing may be configured to rotate relative to the fixed gear. Moving the trigger from the released position to the squeezed position may cause the pair of trigger arms to push the locking member down into the gear released position and may cause the second spring to compress. The third compression spring may be disposed along the shaft between the trigger internal portion and the rotatable gear.

BRIEF DESCRIPTION OF THE DRAWINGS

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

DETAILED DESCRIPTION

Figure 1A:
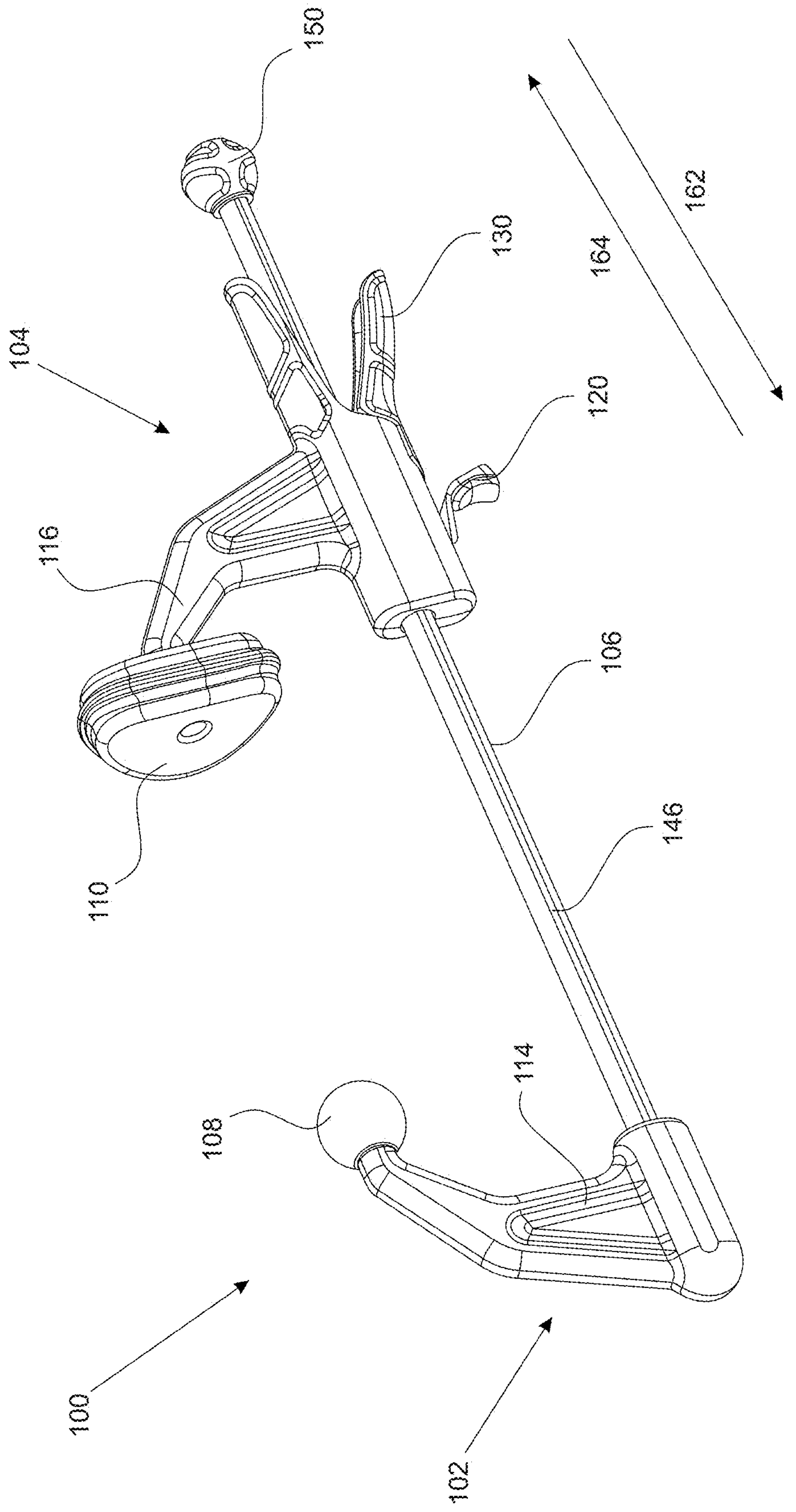
FIGS. 1A and 1B are perspective views of a soft tissue mobilization device having dual actuators that are in the released position and the squeezed position, respectively, in accordance with an aspect of the present invention.
Figure 1B:
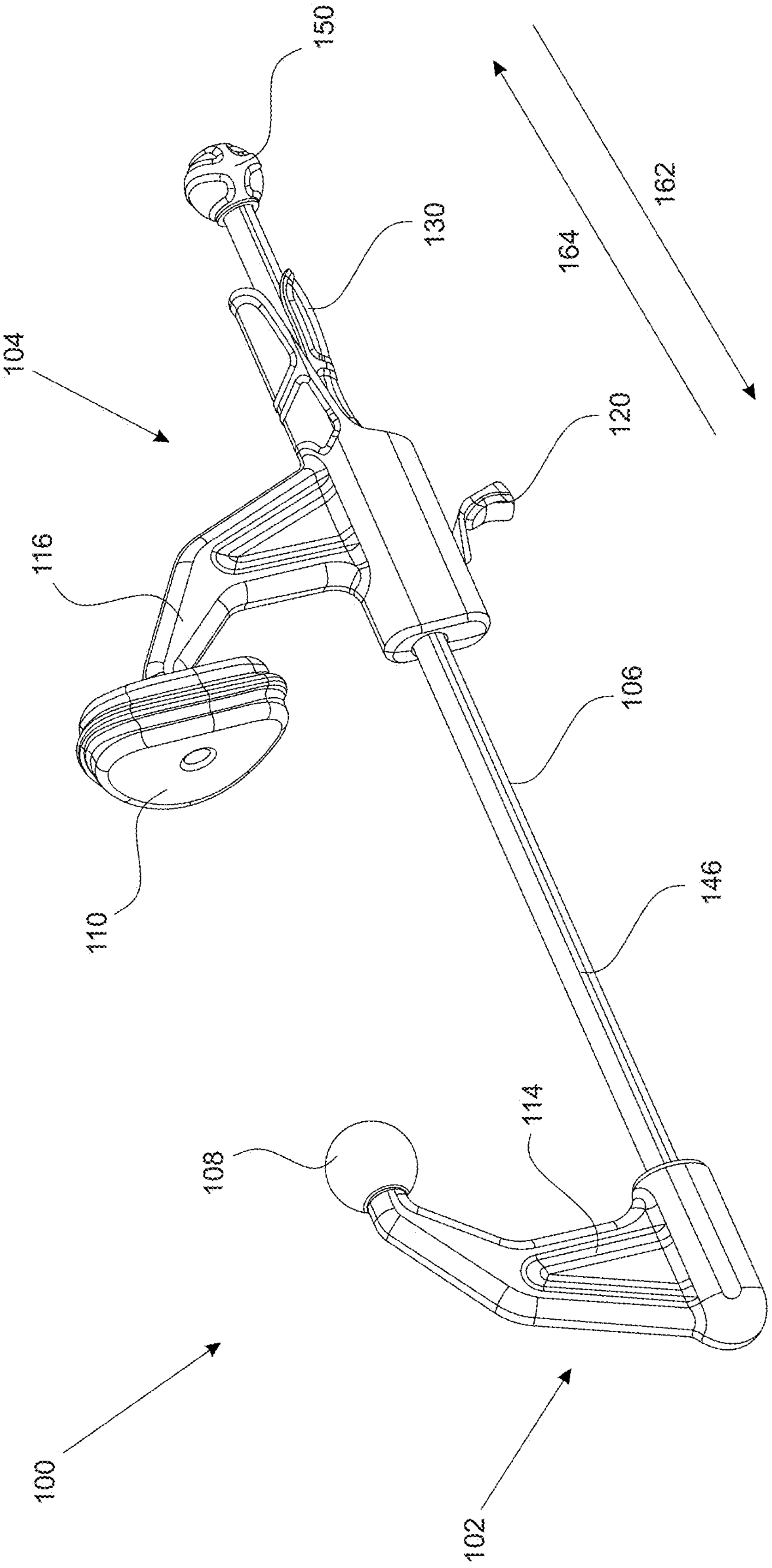
Figure 2A:
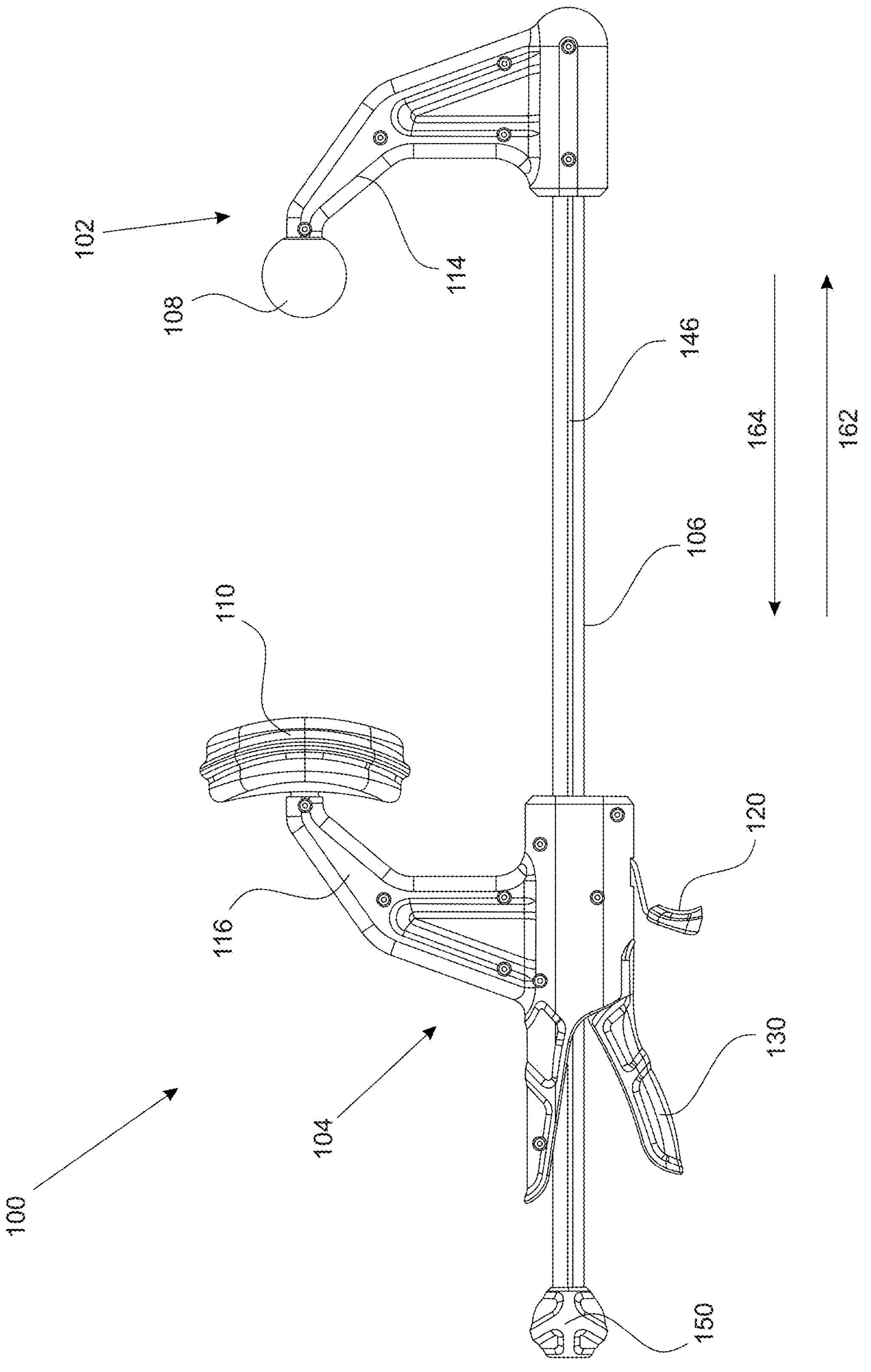
FIGS. 2A and 2B are side views of the soft tissue mobilization device with the dual actuators in the released position and the squeezed position, respectively, in accordance with aspects of the present invention.
Figure 2B:
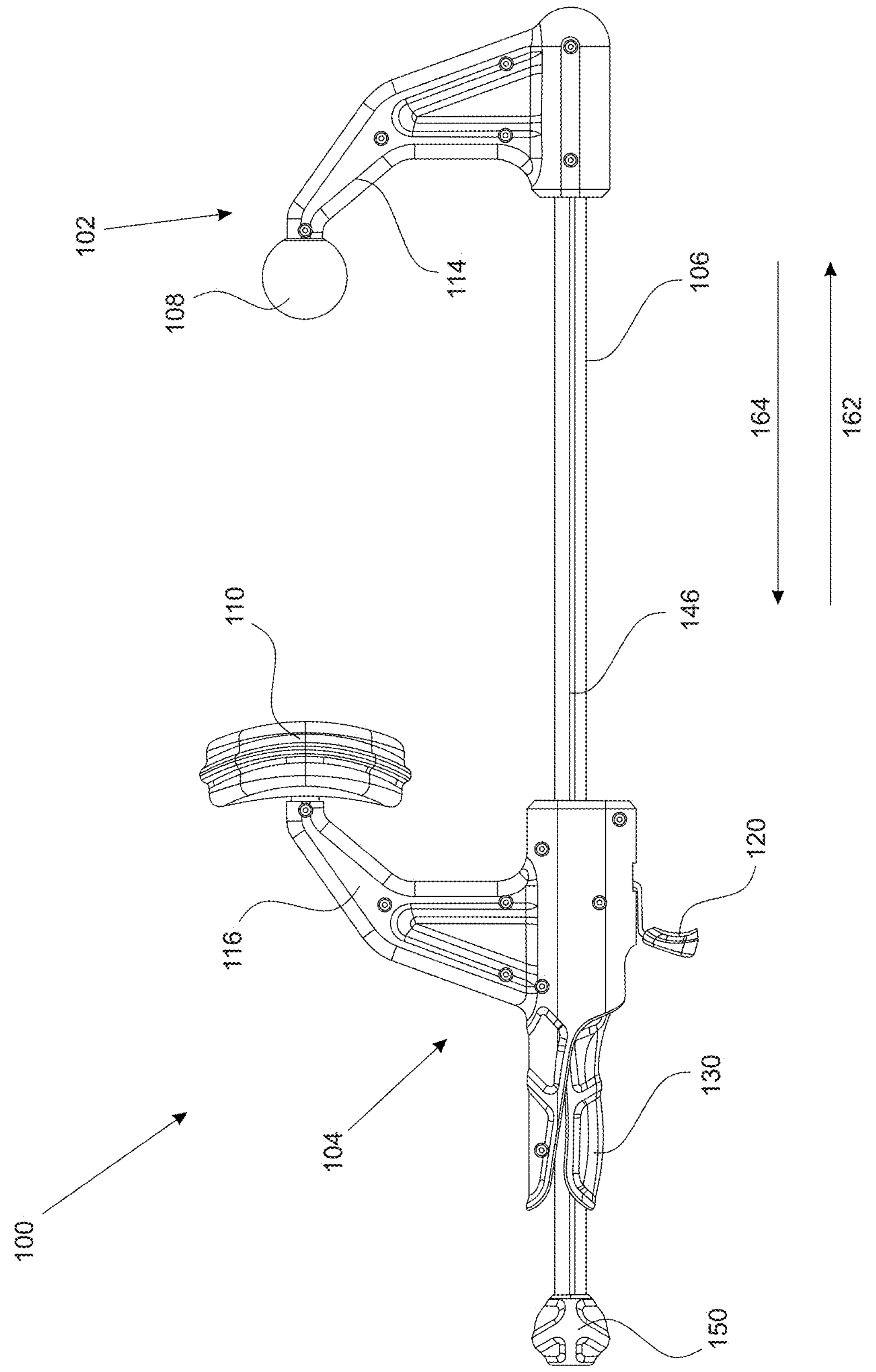

The present invention is for a soft tissue mobilization device that includes a treatment member fixedly coupled to an elongated shaft and a support member configured to slide along the shaft. The support member is also configured to rotate around the shaft so that the relative rotational positions of the treatment member and the support member can be adjusted to accommodate a variety of body areas.

The invention is described by reference to various elements herein. It should be noted, however, that although the various elements of the inventive apparatus are described separately below, the elements need not necessarily be separate. The various embodiments may be interconnected and may be cut out of a singular block or mold. The variety of different ways of forming an inventive apparatus, in accordance with the disclosure herein, may be varied without departing from the scope of the invention.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

The detailed description set forth herein in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Apparatus

The present invention is for a soft tissue mobilization device for applying compression to various parts of the body. The device operates as a mechanical system comprising multiple interconnected components that work in coordination to deliver controlled pressure therapy. The device interfaces with the human body through two primary contact points: the support side and the treatment side. These contact points establish a mechanical relationship wherein the support side provides a stable reaction surface against a body part, while the treatment side applies therapeutic pressure to the targeted tissue area. This dual-contact configuration creates a compression system that utilizes the body's own structural support as a counterforce.

Figure 3:
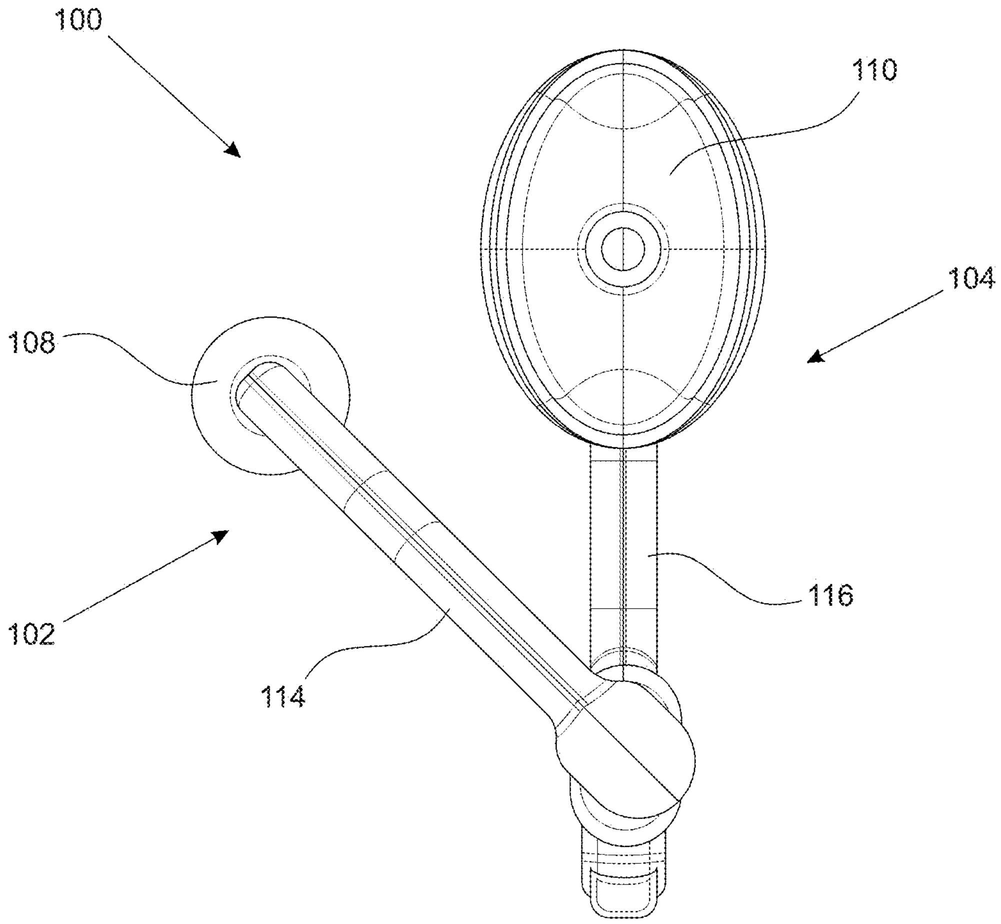
FIG. 3 is an end view of the soft tissue mobilization device with a support side and a treatment side in rotationally offset positions, in accordance with an aspect of the present invention.

An example of the soft tissue mobilization device 100 in accordance with the present invention is shown in FIGS. 1A-3. The treatment side of the device 100 includes a treatment member 102 and the support side includes a support member 104. The treatment member 102 is fixedly attached to one end of a shaft 106. The fixed relationship between the treatment member 102 and the shaft 106 provides a stable reference point for applying controlled pressure during use. The support member 104 is movably mounted to the shaft 106, and is capable of both rotational movement about the longitudinal axis of the shaft 106 and translational movement along the length of the shaft 106. FIG. 3 depicts the treatment member 102 and support member 104 in a rotationally offset position.

The treatment member 102 includes a housing 114 and a pressure applicator 108. The support member 104 includes a housing 116 and a support pad 110. The device 100 is positioned with the pressure applicator 108 in contact with the desired treatment area and the support pad 110 in contact with an opposing body area to provide counter-pressure during therapeutic application. As the support member 104 translates axially along the shaft 106 towards the treatment member 102, pressure applied by the pressure applicator 108 is increased. One advantage of the device 100 is that the support member 104 can be rotated around the shaft 106 so that the relative positions of the pressure applicator 108 and support pad 110 can be adjusted to be in contact with desired body areas, thereby allowing the device 100 to be applied to areas of the body not accessible by conventional devices.

In order to accomplish this adjustability, the support member 104 includes two different actuators. The first actuator is a trigger 120 that functions as a master release. When actuated, the trigger 120 simultaneously enables both rotational movement of the support member 104 about the shaft 106 and translational movement in the proximal direction 164 along the length of the shaft 106. The second actuator is a handle 130 for controlled incremental axial translation of the support member 104 towards the treatment member 102.

The treatment member 102 is fixedly attached to the distal end of the shaft 106 and the proximal end of the shaft 106 has a grip member 150 fixedly attached thereto. The support member 104 is positioned between the treatment member 102 and the grip member 150. The grip member 150 provides an ergonomic gripping surface for guiding rotational movement of the shaft 106 relative to the support member 104. In this example, the grip member 150 is ball-shaped, but may be any other size and shape that facilitates grasping and rotation by the user. The grip member 150 rotates with the shaft 106 and provides a comfortable hand position for controlling the device 100 during positioning and adjustment. This configuration allows a user to hold the support member 104 and actuate the trigger 120 with one hand while using the other hand on the grip member 150 to guide rotational positioning of the treatment member 102 when the trigger 120 is actuated.

During use, the support pad 110 is positioned in contact with the desired support region of the user's body. Next, the trigger 120 is actuated with one hand while the other hand uses the grip member 150 in order to adjust the rotational and axial position of the pressure applicator 108, which is fixedly attached to the opposite end of the shaft 106. When the pressure applicator 108 is in the desired position, the trigger 120 is released, thereby locking the support member 104 in the desired rotational position relative to the shaft 106. In order to increase the amount of pressure applied to the treatment area, the handle 130 is squeezed to incrementally move the support member 104 in the distal direction 162 towards the treatment member 102.

Figure 4:
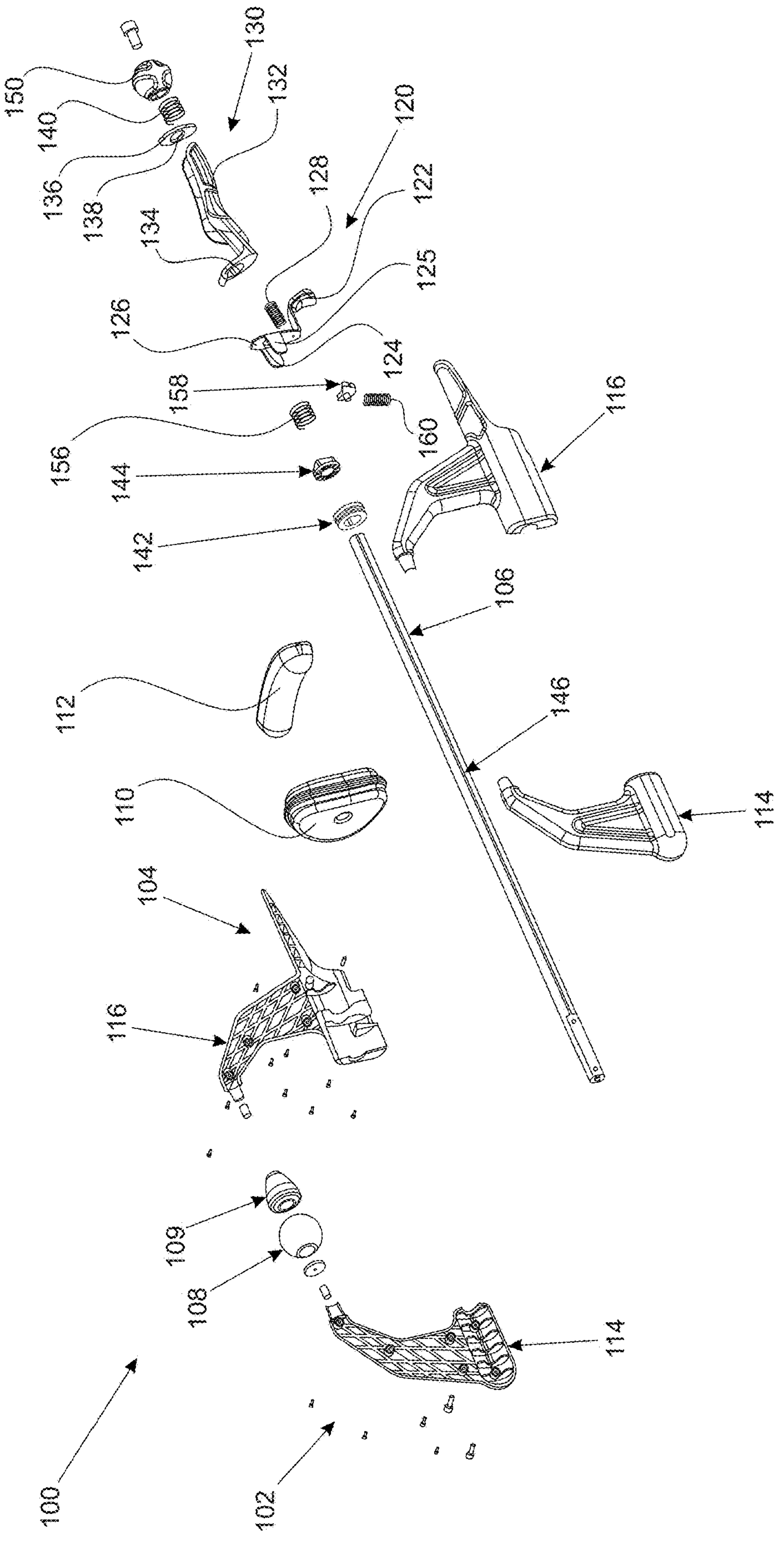
FIG. 4 is an exploded view of the soft tissue mobilization device, in accordance with an aspect of the present invention.

The pressure applicator 108 may be removable and interchangeable. For example, as shown in FIG. 4, interchangeable pressure applicators 108, 109 may be included with the device 100. It will be well understood that pressure applicators having different sizes and shapes besides those depicted may be used with the device 100. Each pressure applicator has a size and shape that is optimized for different therapeutic applications and tissue characteristics.

Similarly, the support pad 110 may be interchangeable with another support pad 112 to enable the user to select an appropriate support pad based on the specific body region being treated and user comfort preferences. It will be well understood that support pads having different sizes and shapes besides those depicted may be used with the device 100. These interchangeable components 108, 109, 110, 112 allow the device 100 to interface with different tissue densities, body contours, and treatment protocols. The modularity enables the device 100 to function across various therapeutic applications, from deep tissue work requiring firm, focused pressure heads to broader surface treatments utilizing distributed pressure pads.

The support member 104 includes an incremental axial translation mechanism operably coupled to the handle 130 and the shaft 106. The incremental axial translation mechanism may be any mechanism capable of affecting incremental axial translation of the support member 104 in the distal direction 162 relative to the shaft 106 when the handle 130 is squeezed. The support member 104 further includes a locking mechanism operably coupled to the trigger 120 and the shaft 106. The locking mechanism may be any mechanism capable of locking the rotational and axial position of the support member 104 relative to the shaft 106 when the trigger 120 is released, and capable of allowing rotational and axial position adjustment of the support member 104 relative to the shaft 106 when the trigger 120 is squeezed. Examples of the incremental axial translation and locking mechanisms in accordance with the present invention will be described in more detail with reference to FIGS. 4-7B.

Figure 5A:
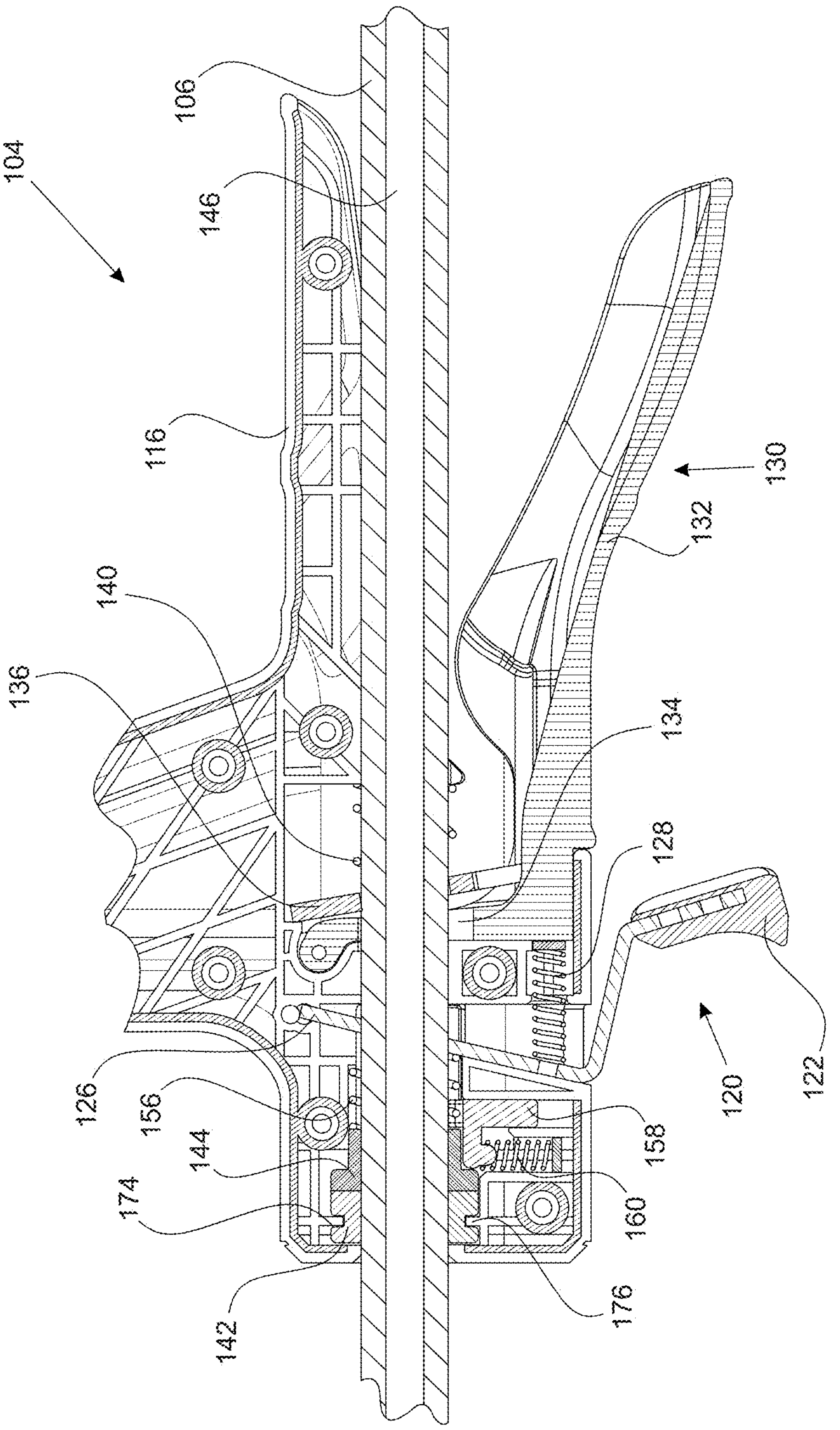
FIGS. 5A and 5B are cross-sectional views of a support member of the soft tissue mobilization device with the dual actuators in the released and squeezed positions, respectively, in accordance with an aspect of the present invention.
Figure 5B:
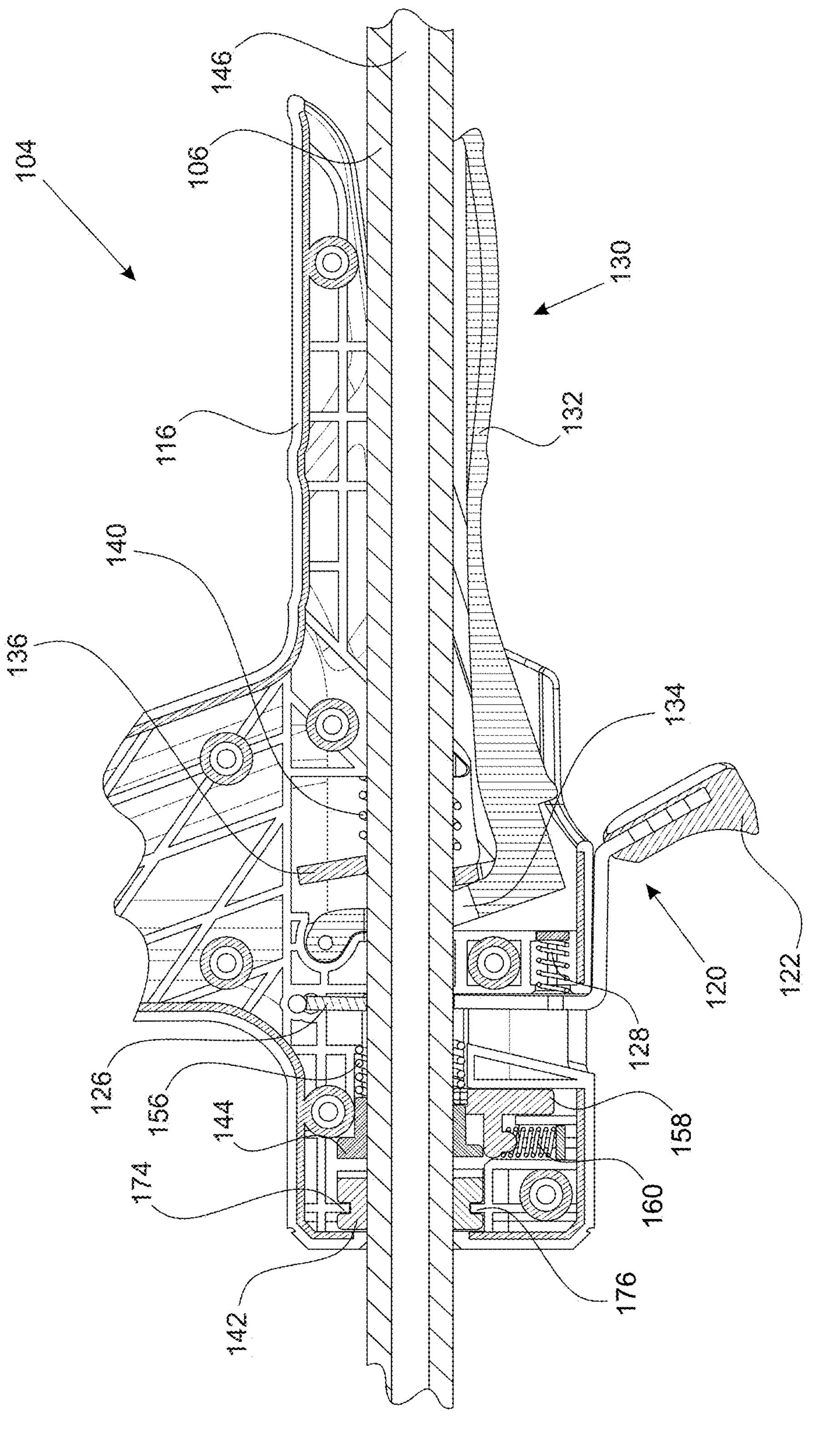
Figure 6A:
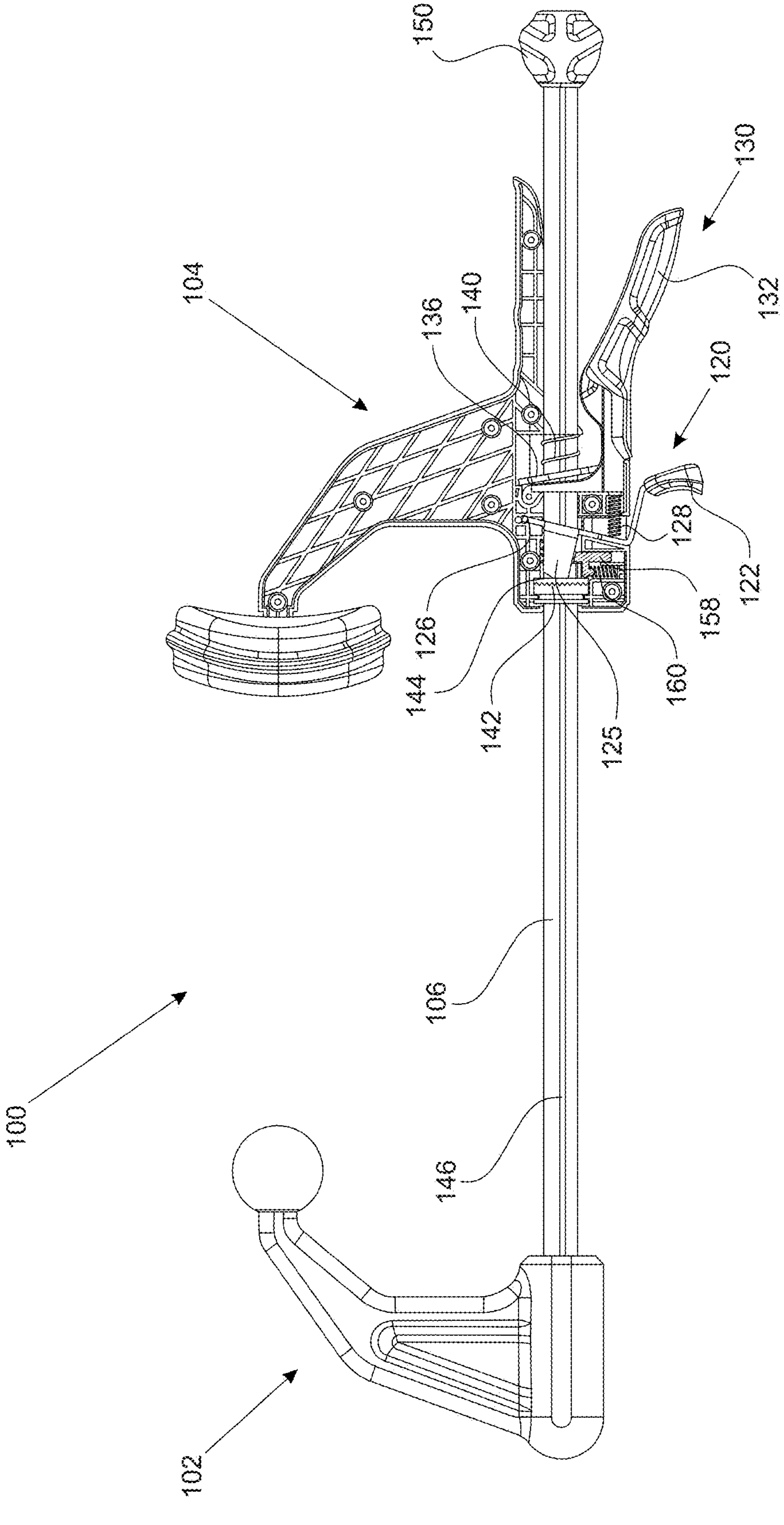
FIGS. 6A and 6B are partial cross-sectional views of the soft tissue mobilization device with the dual actuators in the released and squeezed positions, respectively, in accordance with an aspect of the present invention.
Figure 6B:
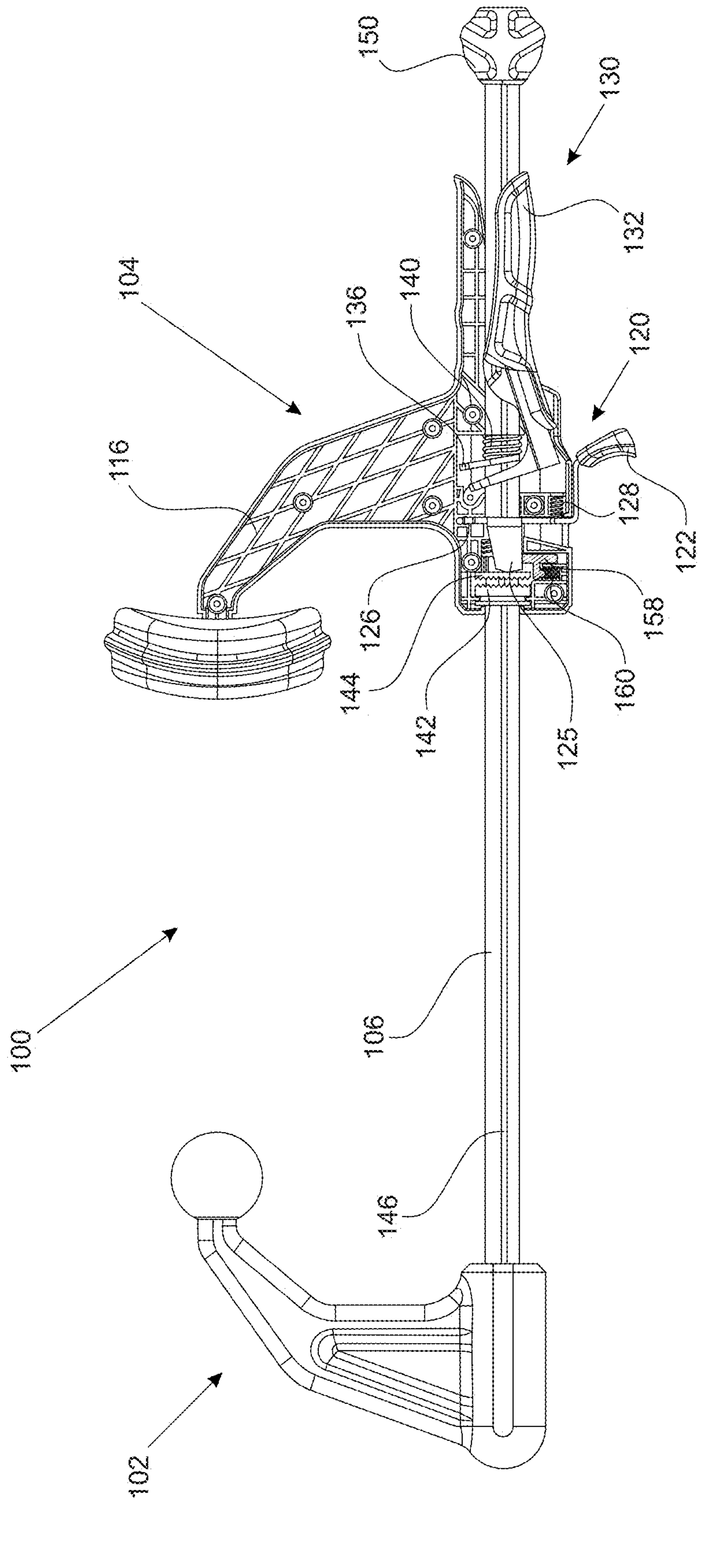
Figure 7A:
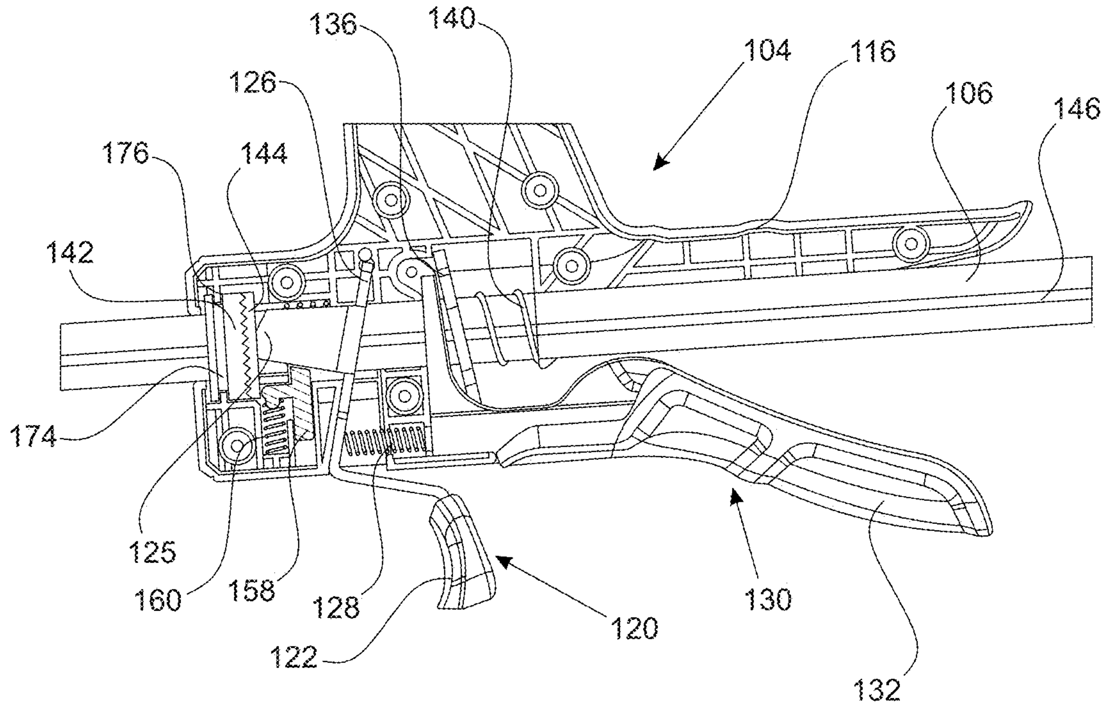
FIGS. 7A and 7B are partial cross-sectional views of a support member of the soft tissue mobilization device with the dual actuators in the released and squeezed positions, respectively, in accordance with an aspect of the present invention.
Figure 7B:
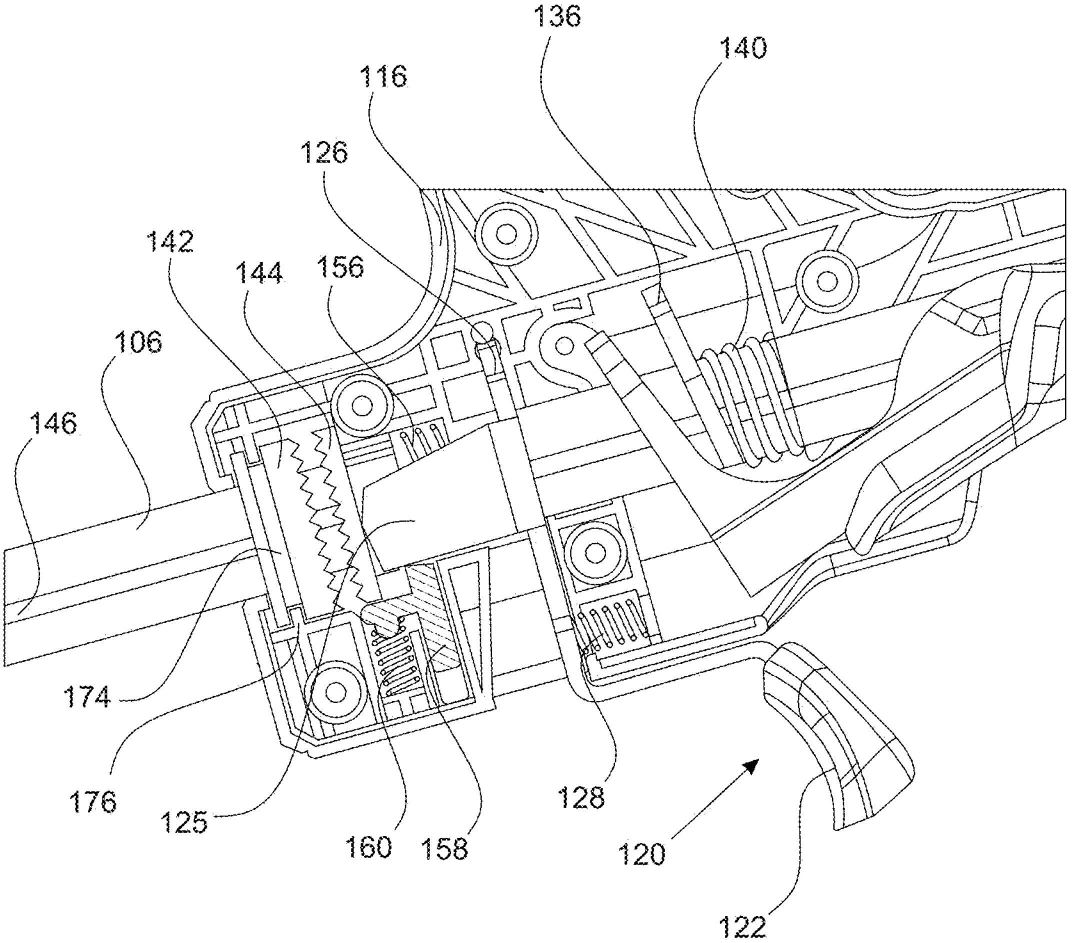

The handle 130 includes an outer portion 132 that protrudes out of the housing 116 of the support member 104 and an inner portion that is disposed inside the housing 116 of the support member 104. The shaft 106 passes through an opening 134 (shown in FIG. 4) in the inner portion of the handle 130. The incremental axial translation mechanism includes a friction plate 136 having a central opening 138 through which the shaft 106 passes and a compression spring 140 that biases the friction plate 136 into a locked position in which the support member 104 is prevented from moving in the distal direction 162 relative to the shaft 106. The compression spring 140 is positioned between the friction plate 136 and the inner surface of the housing 116 of the support member 104. The shaft 106 passes through the center of the spring 140. The friction plate 136 is positioned at an angle relative to the longitudinal axis of the shaft 106 such that the friction plate 136 is configured to selectively engage the outer surface of the shaft 106. When the handle 130 is in a released position, as shown in FIGS. 5A, 6A, and 7A, the friction plate 136 is tilted forward such that the top portion of the friction plate 136 points towards the treatment member 102 on the distal end of the shaft 106 and the bottom portion of the friction plate 136 points towards the grip member 150 on the proximal end of the shaft 106. At this angle, the central opening 138 in the friction plate 136 is offset from the longitudinal axis of the shaft 106 so that the friction plate 136 frictionally engages the shaft 106 and prevents the shaft 106 from translating in the proximal direction 164 relative to the support member 104. When the handle 130 is squeezed, as shown in FIGS. 5B, 6B, and 7B, the friction plate 136 tilts back slightly and the spring 140 is compressed. When the friction plate 136 moves from the forward tilted position (shown in FIGS. 5A, 6A, and 7A) to the position where the friction plate 136 is slightly tilted back (as shown in FIGS. 5B, 6B, and 7B), the friction plate 136 engages the shaft 106 at an angle, thereby gripping the shaft 106 and advancing the support member 104 incrementally toward the treatment member 102. Each squeeze of the handle 130 produces a discrete advancement, typically on the order of a quarter inch, allowing for precise control of the compression force applied between the pressure applicator 108 and the support pad 110. When the handle 130 is released, the spring 140 expands, thereby pressing the friction plate 136 and the handle 130 back into their starting positions where the handle 130 extends from the housing 116 and the friction plate 136 is tilted forward so that the shaft 106 is prevented from moving in the proximal direction 164 relative to the support member 104.

The handle 130 interfaces with the friction plate 136 and the compression spring 140 to convert repetitive squeezing motions into linear advancement of the support member 104 towards the treatment member 102. In other words, with the support member 104 remaining in a stationary position with the support pad 110 in contact with a desired body area, squeezing the handle 130 pulls the shaft 106 in the proximal direction 164 so that the distance between the support member 104 and the treatment member 102 decreases, thereby increasing the pressure applied by the pressure applicator 108. Each actuation of the handle 130 engages the friction plate 136, which grips and pulls the shaft 106 back approximately one-quarter inch per squeeze. This ratcheting action allows for precise, incremental pressure application without requiring continuous manual force from the user. The friction plate 136 and compression spring 140 maintain the achieved position between compressions, preventing the support member 104 from moving in the distal direction 162 when the handle 130 is extended.

Meanwhile, movement of the support member 104 in the proximal direction 164 is prevented by the locking mechanism coupled to the trigger 120. Translation of the support member 104 in the proximal direction 164 is prevented when the trigger 120 is released. As such, distal translation of the support member 104 is prevented when the handle 130 is released and proximal translation of the support member 104 is prevented when the trigger 120 is released. When the trigger 120 is squeezed, the support member 104 is permitted to move in the proximal direction 164 relative to the shaft 106, but is prevented from moving in the distal direction 162 due to frictional engagement between the friction plate 136 and the shaft 106. Conversely, when the handle 130 is squeezed, the support member 104 is permitted to move in the distal direction 162 relative to the shaft 106, but is prevented from moving in the proximal direction 164 due to the frictional engagement between the shaft 106 and an internal portion 126 of the trigger 120. Notably, when both the trigger 120 and the handle 130 are in the released positions, as shown in FIGS. 5A, 6A, and 7A, the internal portion 126 of the trigger 120 and the friction plate 136 are angled in opposite directions relative to the shaft 106.

The trigger 120 is pivotally mounted within the housing 116 of the support member 104 and biased toward a released position by a compression spring 128. The compression spring 128 is positioned between the trigger 120 and the inner surface of the housing 116. The trigger 120 includes an outer portion 122 that extends from the housing 116 of the support member 104 and an inner portion 126 that is disposed within the housing 116. The inner portion 126 of the trigger 120 includes a central opening 124 and a pair of arms 125 positioned on either side of the opening 124 and extending in the distal direction 162. The shaft 106 passes through the central opening 124. When the trigger 120 is released, as shown in FIGS. 5A, 6A, and 7A, the inner portion 126 of the trigger 120 is tilted backwards such that the top portion points towards the grip member 150 on the proximal end of the shaft 106, the bottom portion points towards the treatment member 102 on the distal end of the shaft 106, and the opening 124 is oriented at an angle relative to the shaft axis. When the trigger 120 is squeezed, the opening 124 aligns more closely with the shaft axis, releasing the trigger 120 from frictional engagement with the shaft surface.

The locking mechanism that is operably coupled to the trigger 120 and the shaft 106 is configured to prevent the support member 104 from rotating and axially translating in the proximal direction 164 when the trigger 120 is released, and is configured to allow the support member 104 to rotate and axially translate in the proximal direction 164 when the trigger 120 is squeezed. When the trigger 120 is depressed, it simultaneously disengages both the rotational lock and the axial position lock, permitting free movement of the support member 104 in the rotational and proximal directions relative to the shaft 106.

The locking mechanism includes a fixed gear 142 that is in a rotationally fixed position relative to the shaft 106, a rotatable gear 144 that is configured to engage with the fixed gear 142, a compression spring 156 configured to bias the rotatable gear 144 into engagement with the fixed gear 142, a locking member 158 having a gear locked position and a gear released position, and a compression spring 160 that biases the locking member 158 into the gear locked position. The gears 142, 144 feature complementary teeth configured to engage at predetermined angular increments, such as every 18 degrees, providing discrete rotational positioning options. The teeth of the gears 142, 144 project at right angles to the faces of the gears 142, 144. The gear teeth project in a direction that is parallel to the axis of the shaft 106. This stepped positioning system comprising the fixed gear 142 and the rotational gear 144 provides tactile and audible feedback to the user during rotation.

Figure 8:
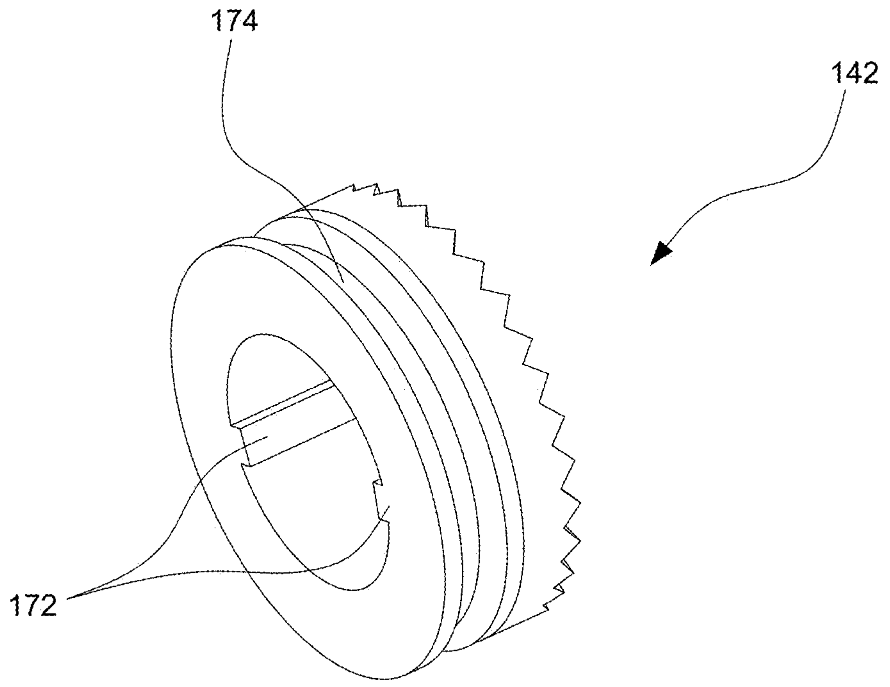
FIG. 8 is a perspective view of a fixed gear that forms part of the rotational locking mechanism of the soft tissue mobilization device, in accordance with an aspect of the present invention.

The fixed gear 142 is configured to translate axially along the shaft 106, but is prevented from rotating relative to the shaft 106. The shaft 106 has a cross-sectional shape that is substantially round and has longitudinal grooves 146 that extend along the length of the shaft 106. As shown in FIG. 8, the fixed gear 142 comprises inwardly protruding teeth 172 that extend into the grooves 146, thereby maintaining the rotational position of the fixed gear 142 relative to the shaft 106 while allowing the fixed gear 142 to translate axially along the length of the shaft 106. The fixed gear 142 also includes a groove 174 around the outer surface thereof. The housing 116 of the support member 104 includes protrusions 176 that fit into the groove 174 in order to maintain a fixed axial position between the housing 116 and the fixed gear 142 while also allowing the housing 116 to rotate relative to the fixed gear 142.

The rotatable gear 144 is fixedly connected to the support member housing 116 so that the housing 116 and the rotatable gear 144 rotate together relative to the shaft 106 when the rotatable gear 144 is disengaged from the fixed gear 142. The compression spring 156 forces the rotatable gear 144 into engagement with the fixed gear 142. When the trigger 120 is released, the compression spring 160 forces the locking member 158 into the upward locked position which prevents the rotatable gear 144 from disengaging from the fixed gear 142. When the trigger 120 is squeezed, the pair of arms 125 extending from the inner portion 126 of the trigger 120 press down on the locking member 158 against the force of the spring 160. Thus, squeezing the trigger 120 forces the locking member 158 into the gear released position in which the rotatable gear 144 is able to disengage from the fixed gear 142 and rotate relative thereto.

This disengagement permits the support member 104 to rotate freely about the shaft 106 to any desired angular position. Upon release of the trigger 120, the forces of the springs 156, 160 cause the locking member 158 to return to its locking position and the gears 142, 144 to re-engage at the nearest predetermined angular increment.

When the gears 142, 144 are meshed together, the support member 104 is locked in rotational position on the shaft 106. In other words, the fixed gear 142 is in a fixed rotational position relative to the housing 116 and the rotatable gear 144 is meshed with the fixed gear 142 so that the rotatable gear 144 is in a fixed rotational position relative to the fixed gear 142 and the support member 104 is not able to rotate. When the locking member 158 is pressed down into the unlocked position, the rotatable gear 144 is able to disengage from the fixed gear 142 and rotate relative to the fixed gear 142 by grasping the ball 150 and rotating the shaft 106 relative to the support member 104. The force required to rotate the shaft 106 must be sufficient to overcome the force of the spring 156 that biases the rotatable gear 144 into engagement with the fixed gear 142. The compression spring 156 thus provides some resistance to the rotation of the moveable gear 144. The user must rotate the shaft 106 relative to the support member 104 with enough force to overcome the force of the compression spring 156 and allow the moveable gear 144 to jump to the next detent.

The unique combination of the trigger-controlled dual-release mechanism and the independent compression handle enables precise therapeutic application. A user can position the device with the treatment and support members 102, 104 at any desired relative angle by squeezing the trigger 120, rotating to the desired position, and releasing the trigger 120 to lock the rotation. Once positioned, the user can then apply incremental compression using only the compression handle 130, maintaining the selected angular orientation while increasing therapeutic pressure. This dual-control system allows for self-treatment of hard-to-reach areas by accommodating the complex contours and non-parallel surfaces of the human body while providing controlled, sustainable pressure application.

The device's configuration solves the problem of applying therapeutic pressure to body areas that are not accessible with conventional straight or fixed-angle devices. The round shaft design, unlike rectangular slide bars used in prior devices, permits complete 360-degree relative rotation between the treatment member 102 and the support member 104. This rotational capability, combined with the ability to lock at specific angular increments while maintaining compression capability, enables therapeutic treatment of body regions with complex geometries that cannot be adequately addressed with devices having fixed or limited angular relationships between their contact surfaces.

ADDITIONAL CONSIDERATIONS

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and/or a process associated with the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A soft tissue mobilization device comprising:

a shaft having a substantially circular cross-sectional shape, a proximal end, and a distal end;

a treatment member fixedly coupled to the distal end of the shaft and having a pressure applicator attached thereto, the pressure applicator configured for being in direct contact with a desired treatment area of a patient's body; and a support member coupled to the shaft and configured to translate axially and rotate relative to the shaft, the support member having a support pad attached thereto, the support pad configured for being in direct contact with a second area of the patient's body, wherein the support member translates along the shaft towards the treatment member in order to increase pressure applied by the pressure applicator, the support member comprising:

a handle configured to move between a compressed position and an extended position;

an incremental axial translation mechanism operably coupled to the handle and the shaft such that actuation of the handle between the extended position and the compressed position causes the support member to translate axially towards the distal end of the shaft by a predetermined incremental distance;

a trigger configured to move between a squeezed position and a released position; and a locking mechanism operably coupled to the trigger and the shaft, wherein the locking mechanism is configured to lock the support member in a rotational position on the shaft when the trigger is in the released position and is further configured to allow the support member to rotate and translate axially along the shaft when the trigger is in the squeezed position.

2. The soft tissue mobilization device of claim 1, wherein the locking mechanism is configured to allow the support member to translate axially towards the proximal end of the shaft when the trigger is in the squeezed position.

3. The soft tissue mobilization device of claim 1, further comprising a grip member fixedly attached to the proximal end of the shaft.

4. The soft tissue mobilization device of claim 1, wherein the support member comprises a housing and the shaft is disposed through a central portion of the housing, and wherein the handle and the trigger are operably coupled to the housing and configured to actuate relative to the housing.

5. The soft tissue mobilization device of claim 1, wherein the incremental axial translation mechanism comprises a compression spring surrounding the shaft and a friction plate having a central opening, wherein the shaft is disposed through the central opening, wherein, when the handle is in the extended position, the friction plate is tilted at a first angle and is in frictional engagement with the shaft such that axial translation of the support member towards the distal end of the shaft is prevented, and wherein moving the handle from the extended position to the compressed position causes the compression spring to compress and causes the friction plate to move from the first angle to a second angle, thereby causing the support member to translate axially towards the distal end of the shaft by the predetermined incremental distance.

6. The soft tissue mobilization device of claim 4, wherein the trigger comprises an external portion configured for actuation by a user, and an internal portion disposed inside the housing, wherein the internal portion comprises a through opening and a pair of arms that are situated on opposite sides of the shaft, wherein the shaft is positioned in the through opening and is configured to rotate and translate axially relative to the trigger when the trigger is in the squeezed position.

7. The soft tissue mobilization device of claim 6, wherein the locking mechanism comprises:

a first compression spring positioned between the trigger and an inner surface of the housing and configured for biasing the trigger in the released position;

a locking member having a gear locked position and a gear released position;

a second compression spring positioned between the inner surface of the housing and the locking member and configured for biasing the locking member into the gear locked position;

a fixed gear that is in a rotationally fixed position relative to the shaft and that is configured to translate axially relative to the shaft;

a rotatable gear that is configured to move between a rotationally locked position in which the rotating gear is prevented from disengaging with the fixed gear, and a rotationally unlocked position in which the rotatable gear is allowed to disengage from, and rotate relative to, the fixed gear upon application of a sufficient amount of rotational force by the user; and a third compression spring positioned between the trigger and the rotatable gear and configured to bias the rotatable gear into engagement with the fixed gear.

8. The soft tissue mobilization device of claim 7, wherein the fixed gear and the rotatable gear have teeth on their respective contacting surfaces that are engaged together.

9. The soft tissue mobilization device of claim 7, wherein the shaft comprises longitudinal grooves and wherein the fixed gear comprises inwardly protruding teeth that are positioned in the longitudinal grooves such that the fixed gear is configured to translate axially relative to the shaft and is prevented from rotating relative to the shaft.

10. The soft tissue mobilization device of claim 7, wherein the fixed gear comprises an outer groove around an outer peripheral surface thereof, and wherein the support member housing comprises a protruding element that protrudes into the outer groove such that the housing and the fixed gear have axial positions that are fixed relative to each other and the housing is configured to rotate relative to the fixed gear.

11. The soft tissue mobilization device of claim 7, wherein moving the trigger from the released position to the squeezed position causes the pair of trigger arms to push the locking member down into the gear released position and causes the second spring to compress.

12. The soft tissue mobilization device of claim 7, wherein the third compression spring is disposed along the shaft between the trigger internal portion and the rotatable gear.

13. The soft tissue mobilization device of claim 4, wherein the incremental axial translation mechanism comprises a friction plate that is tilted forward to prevent axial translation of the support member in the distal direction when the handle is in the extended position and the trigger comprises an internal portion that is tilted backward to prevent axial translation of the support member in the proximal direction when the trigger is in the released position.

* * * * *